Sept. 7, 1954 F. F. OFFNER 2,688,729

RECORDER AMPLIFIER

Filed July 28, 1949

Franklin F. Offner
INVENTOR.

BY Pierce Scheffler & Parker
Attorneys

Patented Sept. 7, 1954

2,688,729

UNITED STATES PATENT OFFICE 2,688,729

RECORDER AMPLIFIER

Franklin F. Offner, Chicago, Ill.

Application July 28, 1949, Serial No. 107,162

7 Claims. (Cl. 324—118)

Figures 1, 2, 3, 4:
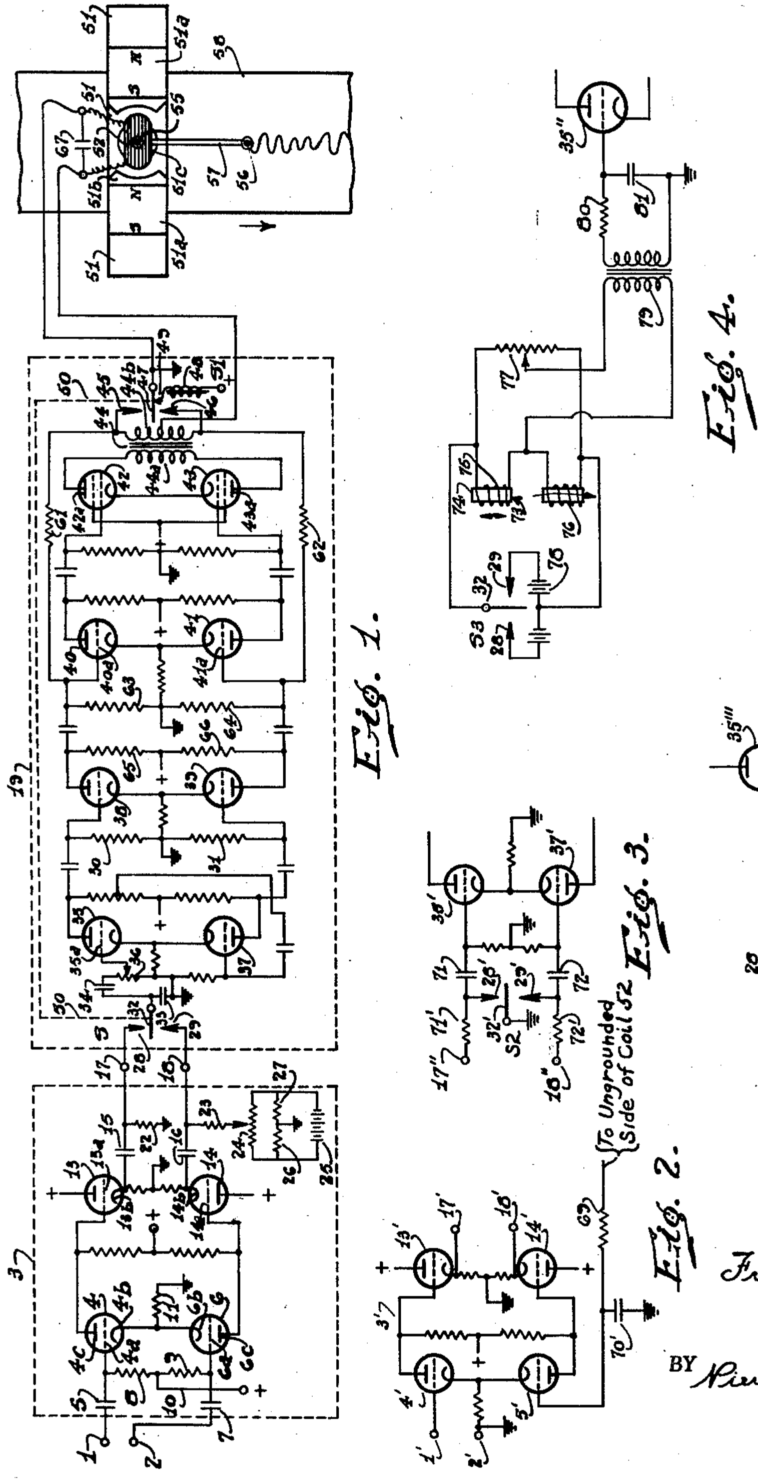

This invention relates to electronic amplifiers and recorder apparatus and in particular to such apparatus as are used in connection with graphic recording of low frequency, low power potentials by means of an electro magnetically operated stylus of the galvanometer type.

Because of the low frequencies involved such as in bio-electric waves produces in electroencephalographic apparatus, it is impractical to use an output transformer to couple the movable coil element of the recorder directly into a vacuum tube circuit. For this reason, in the past such coil elements had to be wound at high impedance for operation either directly in the plate circuit of the tubes; in bridge circuits operated from the plate circuit of the tubes; or through condenser coupling from the plate circuit of the tubes. All these methods of coupling suffer from the disadvantage that they are inefficient in power transfer, making it impossible to pass sufficient power through the coil of the recorder to obtain a satisfactory response to both high and low frequency signals. Also, in order to obtain a reasonable impedance match between the recording coil and the plate circuits of the tubes, it has been necessary to wind the coil from very fine wire to obtain sufficient resistance. This offers a disadvantage that the coils are not only difficult to manufacture, but are fragile and easily burned out. A further disadvantage of all these circuits except the condenser coupled method, is that the center position of the recording stylus depends upon the balance of the plate current in the final stage of the amplifier. It is difficult to control this accurately, and thus the center position of the stylus will vary from time to time.

An object of this invention is therefore to provide an improved electronic amplifier for low frequency input signals which is most stable in operation, extremely accurate in its frequency-response characteristic and which permits a low impedance load to be connected in the ouput.

A more specific object is to provide an improved electronic amplifier for low frequency input signals which includes a pre-amplifier unit that serves as an initial amplifier for the input signals, the output of the pre-amplifier unit being arranged to provide substantially amplified signal voltages to the input of a vibrator i. e. interrupter type of amplifier which functions to provide the remainder of the amplification of the initial low frequency signals but at a higher frequency which is subsequently rectified at the output of the vibrator amplifier to convert the signals back to their initial frequency.

Another object is to provide an improved electric recorder of the magnetically operated stylus type which can be used over a wide range in frequency of the applied signals and which may be efficiently operated from a vacuum tube amplifier circuit without need of a high resistance coil.

These and other objects of the invention will become more apparent from the following detailed description of a preferred embodiment of the invention as applied to a low frequency signal recorder mechanism of the type in which a stylus arm is displaced laterally from a center line zero position on a moving chart in accordance with the angular displacement of a coil operating in a magnetic field, the coil being supplied with current from the amplifier unit which amplifies the initially supplied low frequency, low power signals such as are derived for example from electroencephalographic apparatus. While this particular application has been chosen so as to better enable one to understand the principles involved, the invention of course is not to be so limited. For the scope of the invention reference is made to the appended claims.

Figure 5:
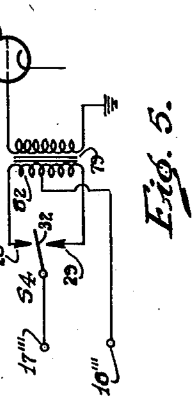

Fig. 1 is a schematic view showing the improved signal amplifier apparatus and the principal operating components of the recorder; Fig. 2 is a schematic view illustrating a modified construction for the pre-amplifier unit shown in Fig. 1; and Figs. 3–5 show modified forms of input circuits.

Referring now to the drawings, and in particular to Fig. 1 thereof, terminals 1 and 2 indicate a source of very low frequency, low power signals, for example in the range of 0.5 to 50 cycles per second and 0.5 to 500 microvolts. These may come, for example, from the brain as in electroencephalographic apparatus. The signals at terminals 1, 2 are first applied to a pre-amplifier unit 3. Terminal 1 is coupled to the signal grid 4*a* to triode 4 through condenser 5, and terminal 2 is similarly coupled to the signal grid 6*a* of triode 6 through condenser 7. Grid return resistors 8 and 9 connected in series across the two input leads are applied with positive potential from lead 10 connected to these resistors at their junction point to overcome the excess bias produced by a large cathode resistor 11, one end of which is grounded and the other end of which is connected to the cathodes 4*b*, 6*b* of tubes 4 and 6. The function of this large cathode resistor is to balance the amplification of 4 and 6, so that equal signal voltages appear at anodes 4*c* and 6*c*. The anodes 4*c*, 6*c* are directly coupled, respectively to the signal grids 13*a*, 14*a*, of the interconnected cathode follower type tubes 13, 14, and the amplified signals taken from the cathodes 13*b*, 14*b* are transmitted through coupling condensers 15, 16 to the input terminals 17, 18 of the vibrator amplifier unit 19.

The provision of a balanced input to the vibrator amplifier 19 has the advantage that it reduces the cross-modulation effects which otherwise would be produced between the vibrator frequency and the frequency of the input signals at terminals 1 and 2. By keeping the input to amplifier 19 balanced, which of course is the output of the preamplifier 3, such cross-modulation effects are minimized. Cross-modulation will show up, for example, with a 100 cycle/sec. vibrator when a 51 cycle/sec. input signal is used. If the input to amplifier 19 is not properly balanced, the output signal of the amplifier 19 will increase and decrease at a frequency of 1 cycle/sec. Amplifier 3 is balanced as explained above so that this undesirable effect is minimized.

If the coupling condensers 15, 16 were perfect, no direct potential would appear at the input terminals 17, 18. However, because there is always present a certain amount of unavoidable leakage through these condensers, some difference in a direct potential will appear on terminals 17, 18. To eliminate this, resistors 22, 23 are employed; resistor 22 is connected at one end to the output side of condenser 15 and the other end is grounded; one end of resistor 23 is similarly connected to the output side of condenser 16 but the other end is connected into a variable resistor 24 to which a voltage is applied from a suitable source such as the illustrated battery 25. The center point on this battery is grounded through equal resistors 26, 27. By varying the tap on resistor 24, a direct potential can thus be applied to condenser 16 sufficient to compensate out any direct voltages appearing at terminals 17, 18.

The vibrator amplifier unit 19 is provided at its input side with an interrupter device such as a vibratory switch S that includes opposed stationary contacts 28, 29 connected respectively to input terminals 17, 18, and a vibrating reed contact 32 which operates between the two stationary contacts 28, 29 to thereby alternately apply the equal signal potentials to condenser 33 charging it correspondingly. Condenser 33 has a large capacity (e. g., 0.01 mfd.) in order to provide optimum sensitivity in the vibrator amplifier unit 19, and the cathode follower type of output (tubes 13—14) of the pre-amplifier unit 3 makes this possible because of the low output impedance characteristic.

The potential on condenser 33 is transmitted through condenser 34 to grid 35*a* of tube 35. Numeral 36 designates the grid coupling resistor of tube 35. Tube 37 is a conventional phase inverter to produce a push-pull signal to the amplifier. This signal is then amplified by push-pull stage (tubes 38—39), then further amplified in a second push-pull stage (tubes 40—41), and then finally amplified in a power stage (tubes 42—43).

Variable resistor 36 in the input circuit of tube 35 controls the overall amplification factor of the amplifier unit 19. Placing the amplification control in this portion of the amplifier operating at the frequency of the vibrator switch S has the advantage that the change of the control does not cause a long persisting erroneous voltage to be developed in the output, as is usually the case when an amplifier control is used in a low frequency amplifier.

In the vibrator amplifier unit 19, only the varying component of the input signal, varying at substantially the vibrator reed frequency is transmitted. This reed frequency should be fairly high as compared with the frequency band to be amplified. If the highest frequency of the band to be amplified is about 50 cycles per sec., a reed frequency of the order of 100 cycles per sec. will be satisfactory. Thus a fairly high frequency is transmitted through the various stages of the amplifier and it can consequently be efficiently transferred through output transformer 44, the primary 44*a* of which is connected between the anodes 42*a*, 43*a* of the power stage tubes. Thus the high output impedance of the amplifier can be stepped down to a comparatively low value in the transformer, for efficient transfer to the low impedance coil of the recorder. The latter have have a resistance of the order of only four ohms.

The output power of the vibrator amplifier unit 19 is rectified by another interrupter device such as vibrator switch S1 that includes a pair of opposed contacts 45, 46 connected to opposite ends of the transformer secondary 44*b* and a vibrating reed contact 47 operating therebetween which is driven electrically from a coil 48 one end of which is connected to the positive terminal of a source of direct voltage and the other end of which is periodically grounded through contact 49 operating on the reed 47 which is grounded. In order for the amplifier to operate properly, the two vibrator switches S and S1 must operate in synchronism. Accordingly, the reed contact 32 on switch S is preferably mechanically linked to the reed contact 47 on switch S1, the linkage between the two being designated schematically on the drawing by the linkage line 50.

The rectified output wave which is an accurate facsimile of the input wave at the signal wave input terminals 1 and 2 is then applied to a sensitive measuring instrument of the permanent magnet-moving coil type for recording. To my knowledge, previous recorders of this general class have employed permanent magnets having a U-shape. I prefer, however, to utilize the construction shown somewhat schematically in the drawings. The magnetic structure of the instrument includes a U-shaped yoke 51 of soft iron, a pair of relatively short straight permanent magnets 51*a*, arcuately faced soft iron pole pieces 51*b* abutting the permanent magnets and which define the magnetic gap, and a cylindrical core 51*c* in the gap also of soft iron. Coil 52 which can be wound to low impedance is carried by a staff 55 journaled in upper and lower jeweled bearings for rotation from a neutral center position in either direction about an axis perpendicular to the plane of the drawing in accordance with the instantaneous magnitude and polarity of the amplifier output. One end of coil 52 is connected to the reed contact 47 on switch S1 and the other end is connected to the mid-point of the transformer secondary 44*b*. The recording pen 56 is secured at the outer end of an arm 57 that is joined to staff 55 and hence traces a record of the angular motion of the coil 52 on the chart member 58 that is moved past the pen 56 at a uniform rate.

Use of the dual permanent magnets adjacent the soft iron pole pieces and soft iron yoke increases the field strength available at the gap, diminishes the leakage flux and reduces the amount of magnetic material necessary to provide a required strength of field at the gap. The construction also has the additional advantage of reducing the strong magnetic fields which are usually found external to instruments of this type, thus reducing the amount of magnetic dirt picked up by the air gap, and reducing other such undesirable effects of large external fields.

As previously explained, condenser 33 at the input of amplifier 19 takes on the voltage of the input terminal to which the vibratory reed 32 of switch S is last connected, and maintains this voltage until the reed 32 moves to and touches the contact connected to the other input terminal. Thus the input voltage to amplifier 19 remains constant while the reed is moving from one contact to the other. Without this condenser 33, the input voltage would fall to zero during the transfer time of the reed. Furthermore, when the reed 32 operates at high speed, it is very likely to bounce against each contact as it hits. With the condenser 33 in the circuit, this bouncing effect does not adversely affect the input voltage since the voltage on the condenser rises to substantially its full value at the instant the reed first touches the contacts, and maintains this voltage in spite of the bouncing of the reed. Another function served by condenser 33 is to eliminate interference pick-up at the input of amplifier 19. Assuming the amplifier to work from a low impedance source, condenser 33 may be made rather large in capacity as previously explained. In this way, any interference pick-up may be bypassed to ground during the time that the reed is transferring from one contact to the other.

It is also desirable to decouple the input grid 35*a* of the tube 35 from the input through condenser 34 and resistor 36 to eliminate the effect of any grid current of tube 35 from flowing through the input circuit. This would produce a steady direct potential at the input and thus cause a direct current to flow through the output coil 52.

Where the frequency of the vibrator switches S and S1 is within the range where the recorder coil 52 has some response, a condenser 67 may be placed across the coil terminals. Actually with the balanced circuit employed, the lowest extraneous frequency which appears across coil 52 is twice the vibrator frequency. When the reed contact 47 moves from contact 45 to contact 46, the voltage is instantaneously removed from across coil 52. However, if condenser 67 has sufficiently large capacity, it will be charged to the voltage existing at contact 45, and maintains substantially this voltage until the reed contact 47 touches contact 46, whereupon it will again maintain the proper voltage. Thus substantially all vibrator frequency or double vibrator frequency component is removed from the current flowing through the recorder coil 52. Condenser 67 maintains the voltage across coil 52 through the time constant of the combination being large compared to twice the vibrator frequency. However, the use of too large a value of condenser 67 will by-pass the higher desired frequencies coming from the amplifier. To minimize this effect, it is essential to maintain the effective output impedance of the amplifier at a very low value, preferably only a small fraction of the impedance of coil 52. Then when the output circuit is completed, through moving contact 47 touching either contact 45 or 46, the effective time constant, which is the output impedance of the amplifier times the capacity of condenser 67, may be made relatively short; while when the contact 47 is touching neither of the two stationary contacts, the time constant will be long, preventing the undesired vibrator frequency from influencing the motion of the recording stylus.

Maintaining the amplifier output impedance low has additional advantage in giving good damping characteristics to the recorder element. To achieve this low output impedance and also to obtain good linearity of response, inverse feedback is employed around the second push-pull and the power stages, tubes (40—41) and (42—43) of amplifier 19. The desired feed-back is produced by the voltage fed back through resistor 61 connected between the upper end of transformer secondary 44*b* and the input grid 40*a* of tube 40, and another resistor 62 connected between the lower end of transformer secondary 44*b* and the input grid 41*a* of tube 41. The voltage is developed across the grid resistors 63, 64 of tubes 40 and 41, in parallel with the plate resistors 65, 66 of tubes 38 and 39, and the plate impedance of the latter tubes.

The advantage of the feed-back circuit illustrated is that it reduces the effect of the resistance and reactance to the transformer, as well as of the vacuum tubes. In this way it is possible to reduce the effective output impedance of the amplifier to a small fraction of one ohm.

Fig. 2 illustrates a modified construction of the pre-amplifier unit 3 shown in the Fig. 1 circuit. In the modified form of the pre-amplifier 3′, the input signals at terminals 1′ and 2′ are applied to the grid and cathode of tube 4′.

The amplifier shown in Fig. 2 is of the directly coupled type, but the transmission of the direct current component of the signal is reduced by the feed-back circuit into the grid of tube 5′ from the ungrounded side of the recorder coil 52. The alternating current components of the output signal which are desired, are removed from the feed-back by filtering out through resistor 69 and condenser 70. The undesired direct current component is passed to the grid of tube 5′, and through an inverse feed-back effect, the amplification of the amplifier 3′ is reduced to a negligible value for any direct current component. Thus direct current in the output of the amplifier 3′ is substantially eliminated without the need of a balance control.

Fig. 3 illustrates a modified form of input circuit to the vibrator amplifier unit 19 shown in Fig. 1. In this circuit, the grid of tube 35′ is always connected, through its coupling condenser 71, to the input terminal 17″; similarly the grid of tube 37′ is always connected, through its coupling condenser 72 to the input terminal 18″. The signals from input terminals 17″ and 18″ are alternately short circuited to ground by the vibrating reed contact 32′ of switch S2 which operates between stationary contacts 28′ and 29′ connected respectively to the terminals 17″ and 18″ through resistors 71′ and 72′. Through this circuit, a balanced input to the amplifier unit 19 is obtained if the input signals to 17″ and 18″ are balanced. Various other alternative input circuits are convenient for other apparatus applications. However, the basic principle of all is the same: the conversion of the low frequency input signal to a higher frequency wave for amplification.

While for applications such as electroencephalograph recording, the low frequency voltage generated by the subject or source is interrupted or switched by the vibrator switch S, in some other applications it is possible to use the vibrator switch to cause the source to generate a voltage of the desired form. One such application is the recording of position, force, or similar variable through the use of a so-called "reluctance" type of pick-up. In these applications, the gauge element may be a coil of wire, which has a magnetic core moved by the variable to be measured. In this way, the inductance value of the coil is changed in accordance with the variable.

Such an arrangement is shown in Figure 4. The reluctance gauge is 73, the core 74 being moved in coil 75 in response to the motion to be recorded. 76 is a variable inductance element for balancing the steady state value of the inductance of 73. The resistance balance of the bridge is achieved by variable resistor 77. The bridge is excited by a square wave voltage, produced by vibrator switch S3 alternately connecting one side and then the other of center tapped battery 78 to one end of the bridge, the center tap of 78 being permanently connected to the other.

If the inductance of 73 is large compared to its resistance effect at the frequency of the vibrator switch, any unbalanced voltage of the bridge will produce essentially a replica of the exciting voltage at the input grid of amplifier 35''. It is convenient to couple the output of the bridge to the amplifier through transformer 79, as shown. Then the remainder of the amplifier and recorder operates in the manner already described, it being noted that switch S3 takes the place of switch S in Fig. 1.

Should the inductance value of 73 be small as compared to its resistance, the bridge will effectively give a differentiated output of the exciting voltage. To restore the square wave, an integrating circuit consisting of resistor 80 and condenser 81 may be incorporated in the amplifier. The time constant of resistor 80 times condenser 81 is made long compared to the period of the square wave. This then will restore the original form of the exciting voltage. In the event that the inductance value of 73 is intermediate in value, the time constant of 80 and 81 may be proportioned as to compensate for any partial differentiation.

Transformer coupling to the amplifier may also be conveniently used in other applications. For such use, the circuit of Figure 5 may be employed. Here input transformer 79 has a center tap primary 82. The input terminals 17''' and 18''' are alternately connected to the two halves of the primary by vibrator switch S4, which takes the place of switch S in Fig. 1. This type of input circuit is particularly useful with low impedance sources, since it allows a large increase in the voltage applied to the grid of tube 35'''.

The vibrators S and S1 with the driving coil and associated contacts may be of the conventional type such as used in present day automobile radio receivers. Alternatively, they may be a motor driven type of contactor; or any of the other known forms of interrupting devices which can be operated in a cyclic manner.

It should be noted that another advantage of this amplification method, not previously mentioned, is that all large inter-stage coupling condensers are eliminated. This prevents "blocking" of the amplifier due to charge up of the condensers by grid current when the amplifier is over-loaded. The coupling condensers 15, 16 can have no grid current flow into them, since condenser 34 blocks out the grid current of tube 35; while condenser 34 is too small to have appreciable blocking time.

I claim:

1. Apparatus for indicating signal voltages of variable frequency in a relatively low frequency range comprising an electronic amplifier to which said signal voltages are applied for amplification, said amplifier having a low output impedance characteristic, a pair of interrupter devices connected respectively at the input and output of said amplifier, means for actuating said interrupter devices synchronously at a frequency higher than that of the signal voltage frequency, said interrupter device at the said amplifier input serving to convert the steady input signal voltages to alternating current signal voltages and said interrupter device at the said amplifier output serving to restore the amplified voltages to their original frequency characteristics, a galvanometer translating device including a movable coil having a low impedance characteristic and a condenser connected in parallel with said coil, the output impedance of said amplifier being low as compared to the impedance of said coil, and circuit connections including the said interrupter device at the said amplifier output for periodically connecting and disconnecting said output to and from said parallel connected coil and condenser respectively, the time constant of the RC circuit formed by said coil and condenser being long when said coil and condenser are disconnected by said interrupter device from said amplifier output, and the time constant of the RC circuit formed by said coil and output of said amplifier in parallel with said condenser being short when said coil and condenser are connected by said interrupter device to said amplifier output.

2. Indicating apparatus as defined in claim 1 wherein said low frequency input signal voltages are constituted by the output from an electrical bridge including a variable reluctance element in one branch thereof and a voltage source for the bridge, and said interrupter device at the input of said amplifier is connected in circuit with said voltage source for periodically interrupting the connections between said voltage source and bridge.

3. Indicating apparatus as defined in claim 2 wherein said variable reluctance element causes a distortion in the wave form of said voltage source for said bridge, and which further includes a corrective network in said amplifier for restoring said wave form to its original shape.

4. Indicating apparatus as defined in claim 2 wherein the said interrupter device at the input of said amplifier is arranged to periodically reverse the polarity of said voltage source as applied to said bridge.

5. Indicating apparatus as defined in claim 1 wherein the output of said amplifier provides two output terminals providing signals of opposite polarity, and wherein said interrupter device at the output of said amplifier is arranged to connect the said output terminals in alternation to said coil of said galvanometer translating device.

6. Indicating apparatus as defined in claim 1 wherein said low frequency input signal voltages are constituted by a balanced output from a pre-amplifier unit.

7. Indicating apparatus as defined in claim 6 wherein said pre-amplifier unit is constructed to provide dual output signal circuits and the interrupter device at the amplifier input connects said output circuits in alternation to said amplifier.

References Cited in the file of this patent

UNITED STATES PATENTS

| Number | Name | Date |
|---|---|---|
| 1,428,156 | Espenschied | Sept. 5, 1922 |
| 2,133,670 | Schuchmann | Oct. 18, 1938 |
| 2,191,315 | Guanella | Feb. 20, 1940 |
| 2,297,543 | Eberhardt et al. | Sept. 29, 1942 |
| 2,413,788 | Sargeant et al. | Jan. 7, 1947 |
| 2,442,298 | Liston | May 25, 1948 |
| 2,459,177 | Moseley et al. | Jan. 18, 1949 |
| 2,459,730 | Williams, Jr. | Jan. 18, 1949 |
| 2,466,691 | Daniels | Apr. 12, 1949 |